United States Patent
Koo et al.

(10) Patent No.: US 10,486,763 B2
(45) Date of Patent: Nov. 26, 2019

(54) FOLDING PERSONAL MOBILITY VEHICLE

(71) Applicants: HYUNDAI MOTOR COMPANY, Seoul (KR); KIA MOTORS CORPORATION, Seoul (KR)

(72) Inventors: Dong Han Koo, Seoul (KR); Jae Young Choi, Seongnam-si (KR); Jun Hwan Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/832,361

(22) Filed: Dec. 5, 2017

(65) Prior Publication Data
US 2018/0186423 A1 Jul. 5, 2018

(30) Foreign Application Priority Data

Jan. 4, 2017 (KR) .................. 10-2017-0001536

(51) Int. Cl.
*B62K 3/00* (2006.01)
*B62K 15/00* (2006.01)

(52) U.S. Cl.
CPC ............ *B62K 3/002* (2013.01); *B62K 15/008* (2013.01)

(58) Field of Classification Search
CPC ............................ B60K 3/002; B60K 15/006
See application file for complete search history.

(56) References Cited

U.S. PATENT DOCUMENTS

| 6,443,470 | B1* | 9/2002 | Ulrich | B62K 3/002 |
| | | | | 280/87.041 |
| 8,162,090 | B2 | 4/2012 | Atherton | |
| 8,459,670 | B1* | 6/2013 | Tizzone | A63C 17/015 |
| | | | | 280/87.042 |
| 8,465,033 | B2 | 6/2013 | Benarrouch | |

(Continued)

FOREIGN PATENT DOCUMENTS

| CN | 104743033 | 7/2015 |
| DE | 10045821 | 3/2002 |

(Continued)

OTHER PUBLICATIONS

ESR 05092018, European Search Report cited in corresponding European Patent Application No. 17205310.0; dated May 9, 2018; 7 pages.

(Continued)

*Primary Examiner* — Hau V Phan
(74) *Attorney, Agent, or Firm* — Lempia Summerfield Katz LLC

(57) ABSTRACT

A folding personal mobility vehicle includes a footboard part including wheels and a handle part including handles. The footboard part includes a front footboard part and a rear footboard part connected to each other through a hinge structure to be folded. The handle part has a length that is changed through sliding and is foldable toward the footboard part. The rear footboard part is folded on the front footboard part through the hinge structure, the handle part is folded on the rear footboard part in a state in which the length of the handle part is shortened through the sliding, and the rear footboard part is positioned between the handle part and the front footboard part in the folded state.

25 Claims, 19 Drawing Sheets

(56) References Cited

U.S. PATENT DOCUMENTS

| | | | | |
|---|---|---|---|---|
| 8,720,918 | B2* | 5/2014 | Liao | B62K 15/006 280/287 |
| 2002/0089137 | A1* | 7/2002 | Chang | B62K 3/002 280/87.041 |
| 2010/0044137 | A1* | 2/2010 | Atherton | B62K 3/002 180/223 |
| 2012/0018968 | A1* | 1/2012 | Joslin | B62K 3/002 280/87.041 |
| 2012/0104714 | A1* | 5/2012 | Sapir | B62K 3/002 280/87.05 |
| 2012/0256386 | A1 | 10/2012 | Benarrouch | |
| 2012/0292882 | A1* | 11/2012 | Ghisolfi | B62K 3/002 280/287 |
| 2012/0319373 | A1* | 12/2012 | Landau | B62K 3/002 280/87.041 |
| 2014/0008882 | A1* | 1/2014 | Liao | B62K 3/002 280/40 |

FOREIGN PATENT DOCUMENTS

| | | |
|---|---|---|
| EP | 2780219 | 9/2014 |
| JP | 2003137164 A | 5/2003 |
| KR | 100959114 | 5/2010 |
| KR | 20160131908 A | 11/2016 |
| WO | 2016043556 | 3/2016 |

OTHER PUBLICATIONS

KR Office Action 20180530, Office Action in corresponding Korean Patent Application No. 10-2017-0001536; dated May 30, 2018; 5 pages.

KR Notice of Allowance 11162018, Notice of Allowance cited in corresponding Korean patent application No. 10-2017-0001536; dated Nov. 16, 2018; 5 pages.

KR Office Action dated Jun. 19, 2019, Office Action cited in the Korean patent application No. 10-2018-0102717; dated Jun. 19, 2019; 5 pp.

* cited by examiner

FOLDING PERSONAL MOBILITY VEHICLE

CROSS REFERENCE TO RELATED APPLICATION

The present application claims priority to Korean Patent Application No. 10-2017-0001536, filed Jan. 4, 2017, the entire contents of which is incorporated herein for all purposes by this reference.

BACKGROUND

1. Technical Field

The present disclosure relates to a folding personal mobility vehicle, and more particularly, to a folding personal mobility vehicle capable of being conveniently carried and being kept even in a narrow space.

2. Description of the Related Art

Due to an environmental pollution problem and an increase in demand on fun while using vehicles, development of a single-person vehicle called a personal mobility vehicle has recently increased.

As an example of the personal mobility vehicle, a transport apparatus called a kick board has been widely used. The kick board is usually configured to include a footboard part, including wheels, and a handle part, including a handle. The handle part generally includes a length greater than that of the footboard.

According to the related art, most of the personal mobility vehicles, including the footboard part and the handle part, do not have a folding structure. Therefore, it is inconvenient to carry and store the non-folding personal mobility vehicles since they occupy a large space.

A general hinge-type folding structure is another example. In this general hinge-type folding structure, the folded components have an empty space between themselves and overlap with each other. However, a volume of the general hinge-type folding structure occupies a large space and is not reduced as small as possible even in a state in which the hinge-type folding structure is folded due to the empty space as described above. Thus, the hinge-type folding structure occupies a large space at the time of being stored or transported.

The contents described as the related art have been provided only to assist in understanding the background of the present disclosure and should not be considered as corresponding to the related art known to those having ordinary skill in the art.

SUMMARY

An object of the present disclosure is to provide a folding personal mobility vehicle capable of being conveniently moved and received by being implemented at a compact size by removing a dead space between a footboard part and a handle part.

According to an embodiment of the present disclosure, a folding personal mobility vehicle includes a footboard part including wheels and a handle part including handles. The footboard part includes a front footboard part and a rear footboard part connected to each other through a hinge structure to be folded. The handle part has a length that is changed through sliding and is foldable toward the footboard part. The rear footboard part is folded on the front footboard part through the hinge structure. The handle part is folded on the rear footboard part in a state in which the length of the handle part is shortened through the sliding. The rear footboard part is positioned between the handle part and the front footboard part in a folded state in which the rear footboard part and the handle part are folded.

The handle part and the rear footboard part, and the rear footboard part and the front footboard part, may be adjacent to each other in parallel in the folded state so that the rear footboard part is positioned between the handle part and the front footboard part.

In a state in which the footboard part is folded, the handle part may be folded to surround a lower surface and a side surface of the folded footboard part and allow a side surface of the handle part and the lower surface of the footboard part to be adjacent to each other.

In a state in which the footboard part is folded, the handle part may be folded to surround a lower surface and a side surface of the folded footboard part and allow a side surface of the handle part and the lower surface of the footboard part to be adjacent to each other. Also, the handle part and the rear footboard part, and the rear footboard part and the front footboard part, may be adjacent to each other in parallel.

According to another embodiment of the present disclosure, a folding personal mobility vehicle includes a footboard part including a front footboard part and a rear footboard part, and includes a handle part including handles. The front footboard part has a wheel carrier disposed in the front thereof and has a front wheel disposed in the wheel carrier. The rear footboard part has a rear wheel disposed in the rear thereof. The front footboard part and the rear footboard part are rotatably coupled to each other through a hinge shaft. The handle part has a length that is changed through sliding, and is coupled to the wheel carrier through a hinge locking mechanism. The rear footboard part rotates around the hinge shaft to be folded on the front footboard part. The handle part rotates through the hinge locking mechanism to be folded on the rear footboard part in a state in which a length of the handle part is shortened by the sliding. The rear footboard part is positioned between the handle part and the front footboard part in a folded state in which the rear footboard part and the handle part are folded.

The handle part may include a lower end handle part coupled to the wheel carrier through a hinge locking means, an upper end handle part coupled to the lower end handle part through a sliding means, and handles provided to be foldable with respect to the upper end handle part.

A rotation center part may be installed at an upper end of the upper end handle part. A left handle and a right handle may be rotatably installed at both sides of the rotation center part, respectively.

The rotation center part may be provided with a left gear sharing a shaft of the left handle and a right gear sharing a shaft of the right handle. The left gear and the right gear may be installed to be engaged with each other, such that even though only one handle of the left handle and the right handle rotates, the other of the left handle and the right handle rotates simultaneously with rotation of the one handle.

The rotation center part may be provided with fixing pins stopping rotation of the handles and mounted on an unlock bar provided therein and may be provided with an unlock button connected to the unlock bar and protruding outwardly of the rotation center part. The handles may include fixing grooves formed so that the fixing pins are insertable thereinto or withdrawable therefrom. When the unlock button is pressed, the unlock bar may be pressed to separate the fixing pins from the fixing grooves, thereby enabling the rotation of the handles.

An elastic member may be installed at the unlock bar in a form in which the elastic member always presses the unlock button outwardly. When external force acting on the unlock button is released, the fixing pins may be elastically inserted into the fixing grooves by the elastic member.

An intermediate handle part may be provided between the upper end handle part and the lower end handle part. The upper end handle part may be slid downwardly by the sliding means to be inserted into the intermediate handle part. The intermediate handle part may be slid downwardly by the sliding means to be inserted into the lower end handle part.

The upper end handle part may have a taper part having an outer diameter that becomes large downwardly and the intermediate handle part may be mounted on and coupled to the taper part. The upper end handle part may have a sliding groove forted therein in a length direction and the intermediate handle part may have a sliding protrusion formed at an upper end of an inner side thereof. The sliding protrusion is slid in the sliding groove to allow the upper end handle part to be insertable into or withdrawable from the intermediate handle part.

The intermediate handle part may have a taper part having an outer diameter that becomes large downwardly and the lower end handle part may be mounted on and coupled to the taper part. The intermediate handle part may have a sliding groove formed therein in a length direction and the lower end handle part may have a sliding protrusion formed at an upper end of an inner side thereof. The sliding protrusion is slid in the sliding groove to allow the intermediate handle part to be insertable into or withdrawable from the lower end handle part.

Sliding grooves may be formed in the upper end handle part and the intermediate handle part in a length direction. Sliding preventing grooves may be formed at upper and lower sides of the sliding grooves and may have a height that gradually becomes narrower as the sliding preventing grooves become distant from the sliding grooves. Lock devices having sliding preventing protrusions may be installed at inner sides of upper ends of the intermediate handle part and the lower end handle part, respectively. The sliding preventing protrusions are inserted into the sliding preventing grooves to prevent the upper end handle part and the intermediate handle part or the intermediate handle part and the lower end handle part from being slid in the length direction.

When the sliding preventing protrusions of the lock devices are in a state in which the sliding preventing protrusions are withdrawn from the sliding preventing grooves, the sliding preventing protrusions may be positioned in the sliding grooves to allow the upper end handle part or the lower end handle part to be slidable.

Fixing slots may be formed at the upper ends of the intermediate handle part and the lower end handle part, respectively. Locking holes may be formed in the lock devices and fixing devices having protrusions may be installed in the locking holes. The protrusions are maintained in the state in which the protrusions are inserted into the fixing slots, thereby allowing the lock device and the intermediate handle part or the lock device and the lower end handle part to be relatively rotatable, while preventing the lock device and the intermediate handle part or the lock device and the lower end handle part from moving in an axial direction.

Sliding preventing members may be provided on outer peripheral surfaces of a lower end of the upper end handle part and a lower end of the intermediate handle part.

A wheel groove may be forted in the front of an upper surface of the front footboard part. The rear wheel may be inserted into the wheel groove when the rear footboard part is folded on the front footboard part.

The rear footboard part may be folded on the front footboard part. The lower end handle part may be folded on the rear footboard part. The handles may be positioned at one side of the front footboard part and the rear footboard part.

The lower end handle part may be maintained in a state in which the lower end handle part is folded by the hinge locking means.

An upper end of the wheel carrier and a lower end of the lower end handle part may be hinge-coupled to each other to allow an operation of folding the handle part. The lower end handle part may be provided with a sliding part and the wheel carrier may be provided with a shaft so that the lower end handle part is rotatable.

The sliding part may include a sliding button installed on the lower end handle part and provided to be slidable and a support member connected to the sliding button and allowing or blocking rotation of the shaft. The sliding part may also include a sliding slot formed so that the sliding button is movable therein, wherein, when the support member is in contact with the upper end of the wheel carrier, the rotation of the shaft may be blocked, and wherein, when the sliding button moves in the sliding slot to release a contact between the support member and the upper end of the wheel carrier, the shaft may become rotatable, such that an operation of folding the handle part toward the footboard part is possible.

The sliding button may move in the sliding slot for the operation of folding the handle part, and may again move after completion of the operation of folding the handle part to stop the rotation of the handle part by blocking the upper end of the wheel carrier.

The footboard part may further include a footboard locking means locking a state in which the front footboard part and the rear footboard part are unfolded.

An edge portion of an upper end of the rear of the front footboard part and an edge portion of an upper end of the front of the rear footboard part may overlap with each other and be rotatably coupled to each other through the hinge shaft.

The footboard locking means may include a locking lever installed at an edge portion of a lower end of the rear of the front footboard part to be rotatable through a lever shaft. The footboard locking means may also include a locking protrusion groove formed at an edge portion of a lower end of the front of the rear footboard part so that a locking protrusion formed at one end of the locking lever is inserted thereinto and hooked thereto. The footboard locking means may also include a lever spring wound around the lever shaft. The lever spring may have one end fixed to the front footboard part and the other end fixed to the locking lever. The lever spring may provide elastic force to the locking lever so that the locking lever rotates in a direction in which the locking protrusion is inserted into the locking protrusion groove.

DETAILED DESCRIPTION OF THE EMBODIMENTS

Hereinafter, a folding personal mobility vehicle according to embodiments of the present disclosure is described with reference to the accompanying drawings.

Figure 1:
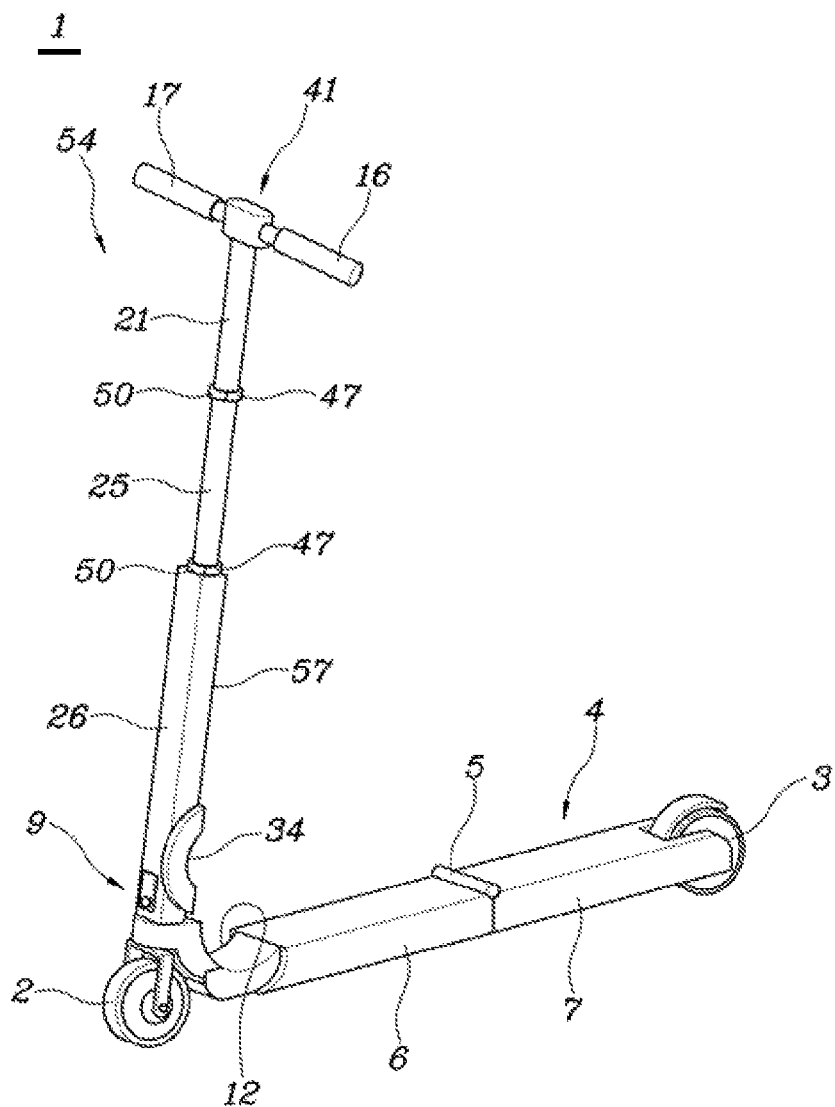
FIG. 1 is a view illustrating a folding personal mobility vehicle according to an embodiment of the present disclosure.
Figure 2:
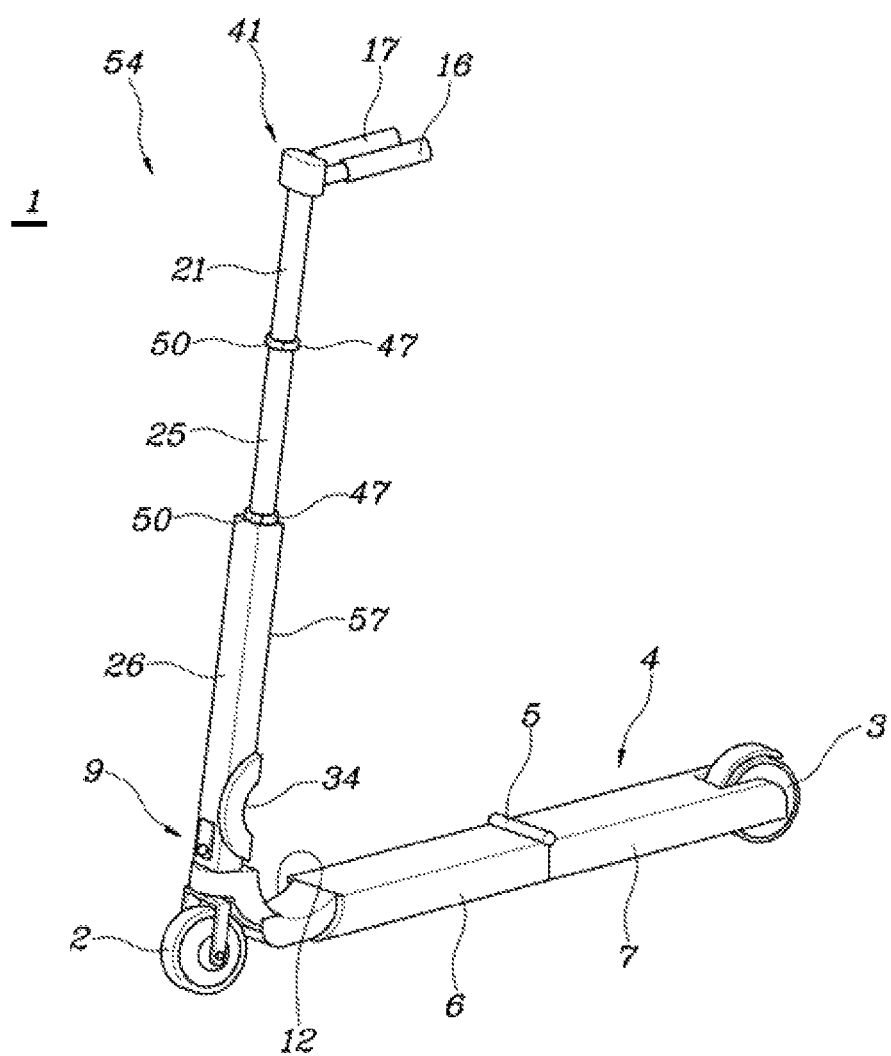
FIGS. 2-5 are views illustrating processes of folding the folding personal mobility vehicle according to an embodiment of the present disclosure and in a state of FIG. 1 in each step.
Figure 3:
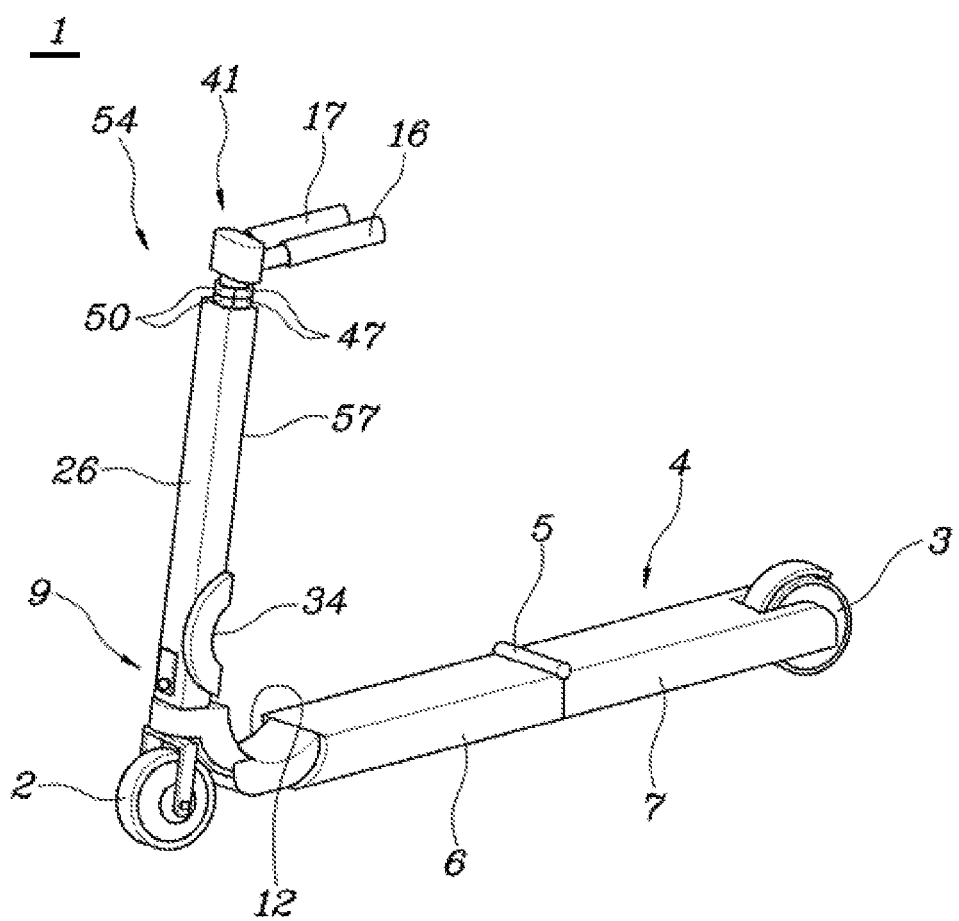
Figure 4:
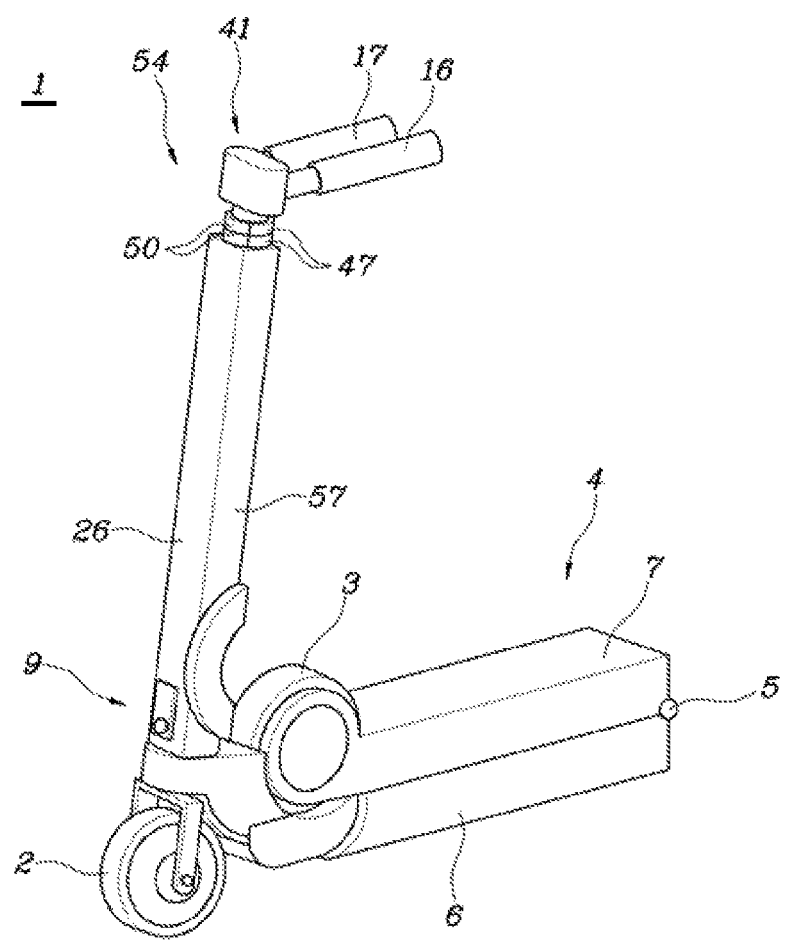

FIG. 1 is a view illustrating a folding personal mobility vehicle 1 according to an embodiment of the present disclosure. FIGS. 2-5 are views illustrating processes of folding the folding personal mobility vehicle 1 according to an embodiment of the present disclosure and in a state of FIG. 1 in each step.

The folding personal mobility vehicle according to an embodiment of the present invention includes a footboard part 4 including wheels 2 and 3 and a handle part 54 including handles 16 and 17. The footboard part 4 includes a front footboard part 6 and a rear footboard part 7 connected to each other through a hinge structure 5 to be folded. The handle part has a length that may be changed through sliding, and that is foldable toward the footboard part 4. The rear footboard part 7 is folded on the front footboard part 6 through the hinge structure 5, the handle part 54 is folded on the rear footboard part 7 in a state in which the length of the handle part 54 is shortened through the sliding, and the rear footboard part 7 is positioned between the handle part 54 and the front footboard part 6 in a state in which the handle part 54 is folded.

That is, in the folding personal mobility vehicle including the footboard part 4 including the wheels 2 and 3 and the handle part 54 including the handles 16 and 17, the footboard part 4 is configured to be foldable using the hinge structure 5, and the handle part 54 is configured to be slid and then foldable, whereby the handle part 54 is folded to become a state in which the handle part 54 surrounds the footboard part 4 after the footboard part 4 is folded.

In the folding personal mobility vehicle 1 according to an embodiment of the present disclosure, when the footboard part 4 is in a state in which the footboard part 4 is folded to be positioned between components of the handle part 54, the handle part 54, the footboard part 4, and components of the footboard part 4 are closely adhered to each other so that empty spaces do not exist therebetween in an overlapping direction. More specifically, in a state in which the footboard part 4 is folded, the handle part 54 is folded to surround a lower surface and a side surface of the folded footboard part 4 and to allow a side surface of the handle part 54 and the lower surface of the footboard part 4 to be closely adhered to each other, such that the handle part 54 and the rear footboard part 7 and the rear footboard part 7 and the front footboard part 6 are adjacent to each other and are parallel with each other in a state in which the handle part 54 is folded so that the rear footboard part 7 is positioned between the handle part 54 and the front footboard part 6. Therefore, in the state in which the footboard part 4 is folded, the handle part 54 is folded to surround the lower surface and the side surface of the folded footboard part 4 and to allow the side surface of the handle part 54 and the lower surface of the footboard part 4 to be adjacent to each other. Also, the handle part 54 and the rear footboard part 7, and the rear footboard part 7 and the front footboard part 6, are adjacent to each other and parallel with each other. As a result, the folding personal mobility vehicle 1 according to an embodiment of the present disclosure may be received in fit through a door D of a vehicle.

Figure 5:
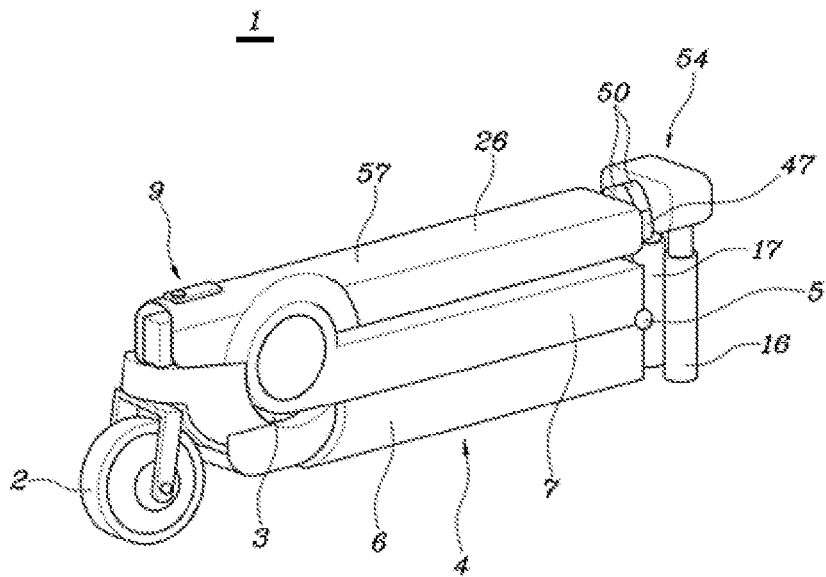

Referring to the drawings, in a state of FIG. 1, a user H rotates the handles 16 and 17 of the handle part 54 by 90 degrees to fold the handles 16 and 17. When the handles 16 and 17 are folded, the handle part 54 is slid and sequentially received, such that a length of the handle part 54 shortens as in a state of FIG. 3. When the reception of the handle part 54 ends, the footboard part 4 is folded using a hinge structure 5 of the footboard part 4, and the components of the footboard part 4 are closely adhered to each other so that an empty space does not exist therebetween. Next, as illustrated in FIG. 5, the handle part 54 is folded with respect to the folded footboard part 4 to surround the lower surface and the side surface of the footboard part 4 and to allow the side surface of the handle part 54 and the lower surface of the footboard part 4 to be adjacent to each other. Also, the handle part 54 is folded so that the handle part 54 and the rear footboard part 7, and the rear footboard part 7 and the front footboard part 6, are adjacent to each other and parallel with each other. Therefore, according to an embodiment of the present disclosure, a dead space that existed in the folding personal mobility vehicle 1 between a footboard part and a handle part when the handle part is folded with respect to the footboard part in the related art is removed, such that an entire size of the folding personal mobility vehicle 1 may be reduced. Therefore, the user H may directly move the folding personal mobility vehicle 1 or receive the folding personal mobility vehicle in the door D of the vehicle, if necessary.

The folding personal mobility vehicle 1 according to an embodiment of the present disclosure is described in more detail with reference to the drawings.

As illustrated in FIG. 1, the folding personal mobility vehicle 1 according to an embodiment of the present disclosure includes a footboard part 4 including wheels 2 and 3 and a handle part 54 including handles 16 and 17. The footboard part 4 is configured to include a front footboard part 6 having a wheel carrier 8 coupled to the front thereof and having a front wheel 2 coupled to the wheel carrier 8. The footboard part 4 is configured to also include a rear footboard part 7 that is rotatably coupled to the front footboard part 6 through a hinge shaft 35 of the hinge structure 5. The rear footboard part 7 is configured having a rear wheel 3 coupled to the rear thereof, and to be folded to be closely adhered onto the front footboard part 6. The handle part 54 is configured to include a lower end handle part 26 coupled to the wheel carrier 8 through a hinge locking means 9, an upper end handle part 21 coupled to the lower end handle part 26 through a sliding means 28, and handles 16 and 17 provided to be foldable with respect to the upper end handle part 21. Therefore, the rear footboard part 7 rotates around the hinge shaft 35 to be folded on the front footboard part 6, the handle part 54 rotates through the hinge locking means 9 to be folded on the rear footboard part 7 in a state in which a length of the handle part 54 is shortened by sliding, and the rear footboard part 7 is positioned between the handle part 54 and the front footboard part 6 in a state in which the handle part 54 is folded.

First, the handle part 54 will be described. The handle part 54 is configured to include the lower end handle part 26 coupled to the wheel carrier 8 through the hinge locking means 9, the upper end handle part 21 coupled to the lower end handle part 26 through the sliding means 28, and the handles 16 and 17 provided to be foldable with respect to the upper end handle part 21.

Figure 6:
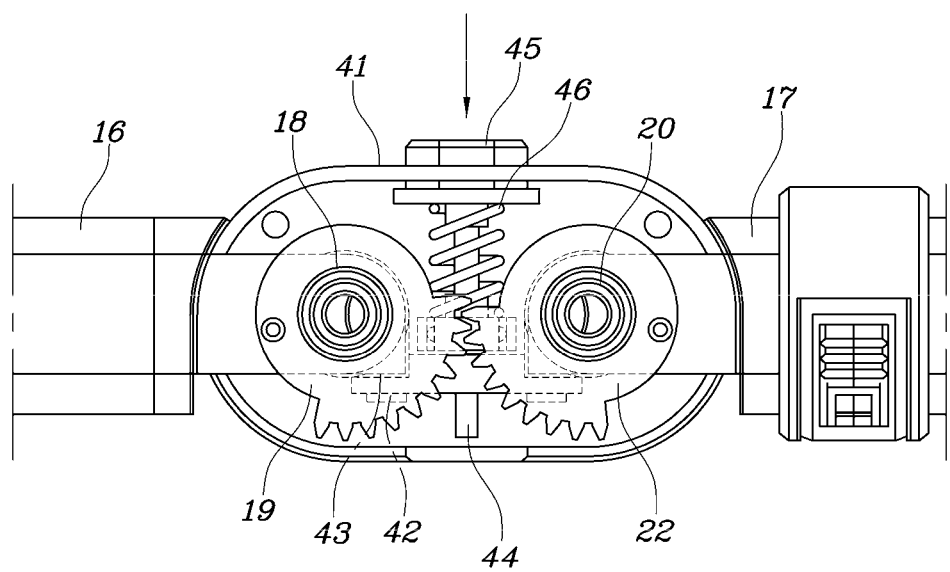
FIGS. 6-8 are views illustrating processes of folding handles in each step.
Figure 7:
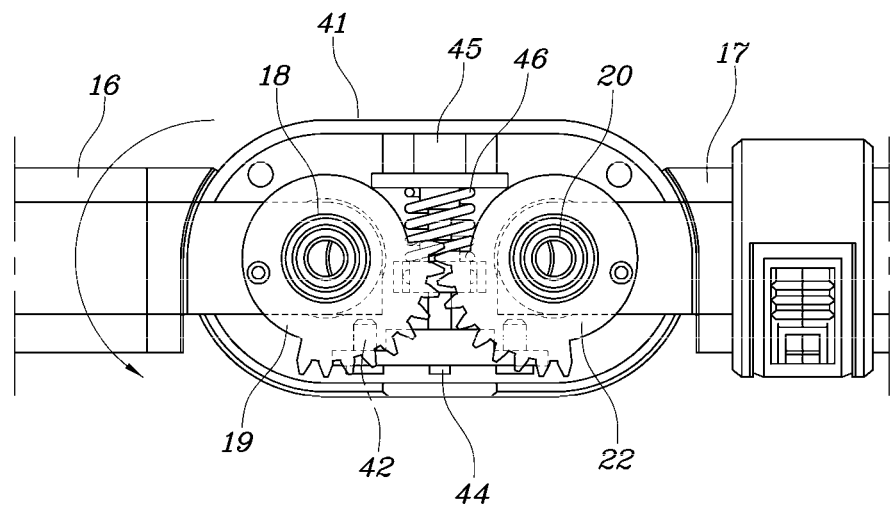
Figure 8:
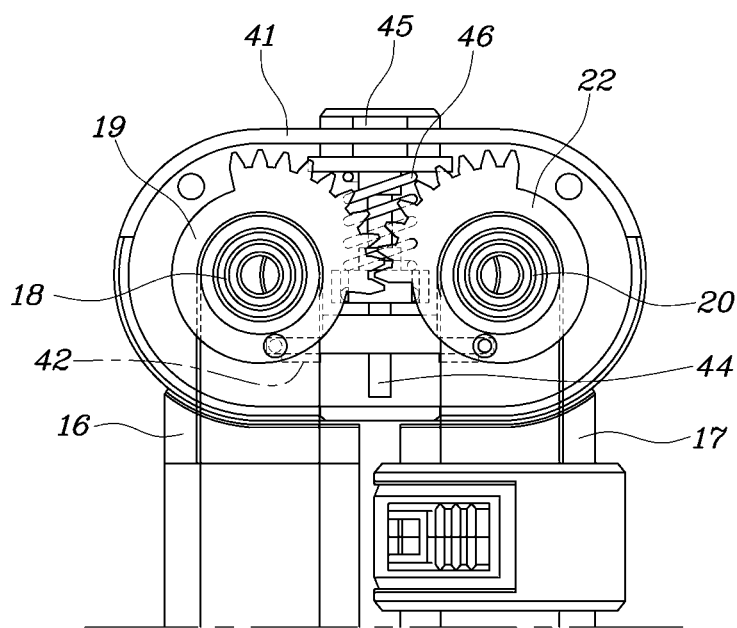

FIGS. 6-8 are views illustrating processes of folding the handles 16 and 17 in each step. As illustrated in FIGS. 6-8, a rotation center part 41 is installed at an upper end of the upper end handle part 21. A liquid crystal display (LCD) screen that may display a speed, a battery remaining amount, or the like, is exposed on the rotation center part 41. The handles 16 and 17 are installed at the left and the right, respectively, below the LCD screen, so as to be rotatable by shafts 18 and 20. The left handle 16 is installed with a left gear 19 sharing the shaft 18 therewith, and the right handle 17 is installed with a right gear 22 sharing the shaft 20 therewith. Particularly, the left gear 19 and the right gear 22 are installed to be engaged with each other, such that even though only one of the left handle 16 or the right handle 17 rotates, the other of the left handle 16 and the right handle 17 is operated to rotate simultaneously with rotation of the one handle. Therefore, the user H may easily manipulate the handles with one hand.

The rotation center part 41 is provided with fixing pins 42 to stop the rotation of the handles 16 and 17. The handles 16 and 17 include fixing grooves 43 formed at points corresponding to the fixing pins 42 so that the fixing pins 42 are insertable thereinto or withdrawable therefrom. The fixing pins 42 are mounted on an unlock bar 44 provided in the rotation center part 41, and the unlock bar 44 is provided with an unlock button 45 connected to the unlock bar 44 and protruding outwardly of the rotation center part 41. Therefore, when the user H presses the unlock button 45, the unlock bar 44 is pressed to separate the fixing pins 42 from the fixing grooves 43, thereby enabling the rotation of the handles 16 and 17. In addition, an elastic member 46 is installed at the unlock bar 44 in a form in which the elastic member always presses or biases the unlock button 45 outwardly. Therefore, since the elastic member 46 is continuously in a compressed state at the time of an operation of the unlock button 45, the user H needs to fold the handles 16 and 17 in a state in which he/she continuously presses the unlock button 45 with one hand.

Therefore, when the user H releases external force acting on the unlock button 45 after folding the handles 16 and 17, the fixing pins 42 are elastically inserted into the fixing grooves 43 by the elastic member 46. In this state, when the unlock button 45 is not pressed, the fixing pins 43 support or retain the handles 16 and 17 so as not to rotate, thereby providing stability.

Figure 9A:
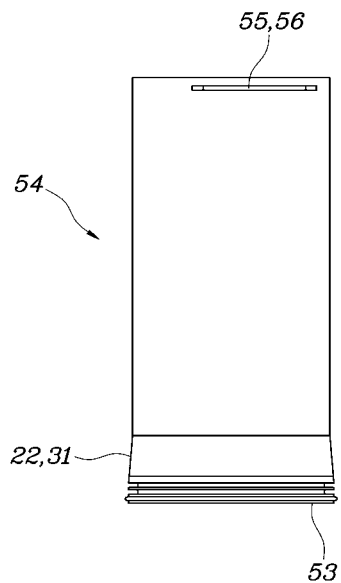
FIGS. 9A, 9B, 9C, and 10 are views illustrating a handle part in detail.
Figure 9B:
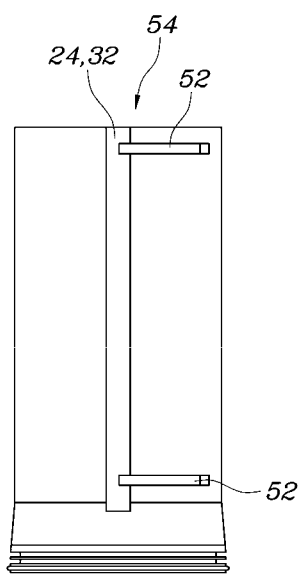
Figure 9C:
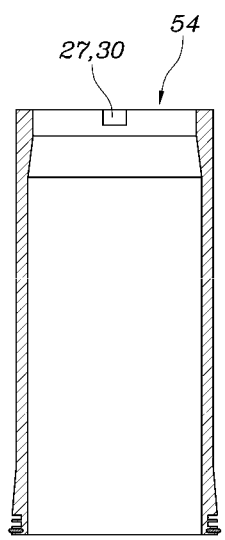
Figure 10:
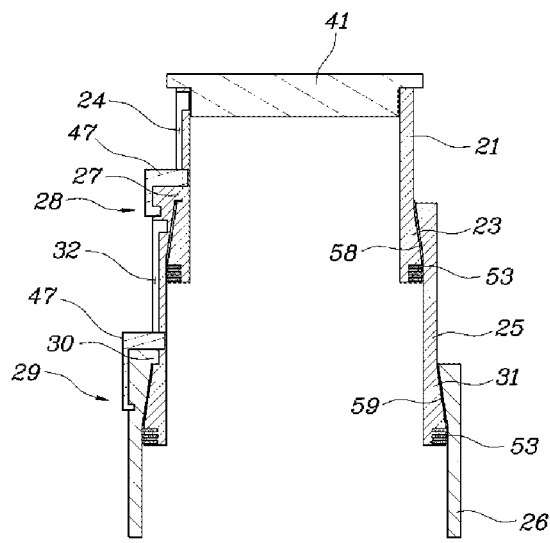

FIGS. 9A-10 are views illustrating the handle part 54 in detail. The handle part 54 is configured to include the lower end handle part 26 coupled to the wheel carrier 8 through the hinge locking means 9 and the upper end handle part 21 coupled to the lower end handle part 26 through the sliding means 28. Although the handle part 54 may be configured to include the upper end handle part 21 and the lower end handle part 26 as described above, an embodiment in which the handle part 54 includes an intermediate handle part 25 provided between the upper end handle part 21 and the lower end handle part 26 to be configured in a three-stage form is illustrated and described by way of example in the present disclosure.

The upper end handle part 21, the intermediate handle part 25, and the lower end handle part 26 may have a pipe shape, as illustrated in FIGS. 9A-10. Particularly, an inner diameter increases from the upper end handle part 21 toward the lower end handle part 26, such that the upper end handle part 21 is slid downwardly by the sliding means 28 to be inserted into the intermediate handle part 25 and the intermediate handle part 25 is slid downwardly by a sliding means 29 to be inserted into the lower end handle part 26. As a result, the folding personal mobility vehicle 1 may have a compact size by reducing or shortening a height of the handle part 54.

As illustrated in FIGS. 9A-10, the upper end handle part 21 has a taper part 23 having an outer diameter that becomes larger downwardly. The intermediate handle part 25 is mounted on and coupled to the taper part 23. Therefore, when the upper end handle part 21 is completely withdrawn from the intermediate handle part 25, a lower side of the upper end handle part 21 and an upper side of the intermediate handle part 25 are in surface-contact with each other to be firmly and stably fixed. Particularly, a taper part 58 having a shape corresponding to that of the taper part 23 of the upper end handle part 21 and having an inner diameter that becomes large downwardly is forted at an inner side of the intermediate handle part 25, and the two taper parts 23 and 58 may be in surface-contact with each other to be stably supported. A sliding preventing member 53 is provided on an outer peripheral surface of a lower end of the upper end handle part 21. When the upper end handle part 21 is not completely withdrawn from the intermediate handle part 25, but is disposed at an intermediate position, the intermediate handle part 25 is in contact with the sliding preventing member 53. Therefore, when the upper end handle part 21 is withdrawn from the intermediate handle part 25, operation may be smoother, noise may be reduced, and a rapid descent at the time of reception may be prevented. In addition, the upper end handle part 21 has a sliding groove 24 formed therein in a length direction. Sliding preventing grooves 52 are formed at a predetermined length at upper and lower sides of the sliding groove 24 in a circumferential direction of the upper end handle part 21. The sliding preventing grooves 52 are formed to have a height that gradually narrows as they become more distant from the sliding groove 24. The sliding preventing member 53 may be an O-ring, and a plurality of sliding preventing members 53 may be installed to be spaced apart from each other in a vertical direction.

In addition, as in the upper end handle part 21, the intermediate handle part 25 also has a taper part 31 having an outer diameter that becomes large downwardly, and the lower end handle part 26 is mounted on and coupled to the taper part 31. Therefore, only when the intermediate handle part 25 is completely withdrawn from the lower end handle part 26, a lower side of the intermediate handle part 25 and an upper side of the lower end handle part 26 are in surface-contact with each other to be firmly and stably fixed. Particularly, a taper part 59 having a shape corresponding to that of the taper part 31 of the intermediate handle part 25 and having an inner diameter that becomes large downwardly is also folioed at an inner side of the lower end handle part 26. The two taper parts 31 and 59 may be in surface-contact with each other to be stably supported. A sliding preventing member 53 is also provided on an outer peripheral surface of a lower end of the intermediate handle part 25. When the intermediate handle part 25 is not completely withdrawn from the lower end handle part 26, but is disposed at an intermediate position, the lower end handle part 26 is in contact with the sliding preventing member 53. Therefore, when the intermediate handle part 25 is withdrawn from the lower end handle part 26, operation may be smoother, noise may be reduced, and a rapid descent at the time of reception may be prevented. In addition, the intermediate handle part 25 has a sliding groove 32 formed therein in the length direction. Sliding preventing grooves 52 are formed at a predetermined length at upper and lower sides of the sliding groove 32 in a circumferential direction. The sliding preventing grooves 52 are formed to have a height that gradually narrows as they become more distant from the sliding groove 32. The sliding preventing member 53 may be an O-ring, and a plurality of sliding preventing members 53 may be installed to be spaced apart from each other in a vertical direction.

The intermediate handle part 25 and the lower end handle part 26 have sliding protrusions 27 and 30 formed at upper ends of inner sides thereof, respectively. The sliding protrusion 27 of the intermediate handle part 25 is slid into the sliding groove 24 of the upper end handle part 21, such that the upper end handle part 21 does not rotate, but is slid in only the vertical direction to be insertable into or withdrawable from the intermediate handle part 25. In addition, the sliding protrusion 30 of the lower end handle part 26 is slid into the sliding groove 32 of the intermediate handle part 25, such that the intermediate handle part 25 does not rotate, but is slid in only the vertical direction to be insertable into or withdrawable from the lower end handle part 26.

A housing 57 is separately installed at an outer side of the lower end handle part 26, and the wheel carrier 8 is installed in the housing 57 to increase durability and handling stability. In addition, a wheel groove 34 is formed at a position corresponding to that of a wheel groove 12 of the front footboard part 6 in the housing 57. The rear wheel 3 is inserted into the wheel groove 34.

Lock devices 47 that are separately formed are installed at upper ends of the intermediate handle part 25 and the lower end handle part 26, respectively. The lock devices 47 are installed, respectively, in fixing slots 55 and 56, which are formed, respectively, at the upper ends of the intermediate handle part 25 and the lower end handle part 26. Fixing devices 50 that are separately formed penetrate through the lock devices 47 and are then coupled to the fixing slots 55 and 56. These components are devices for maintaining an insertion completed state after the upper end handle part 21, the intermediate handle part 25, and the lower end handle part 26 are slid and inserted or withdrawn after the upper end handle part 21, the intermediate handle part 25, and the lower end handle part 26 are withdrawn.

Figure 11:
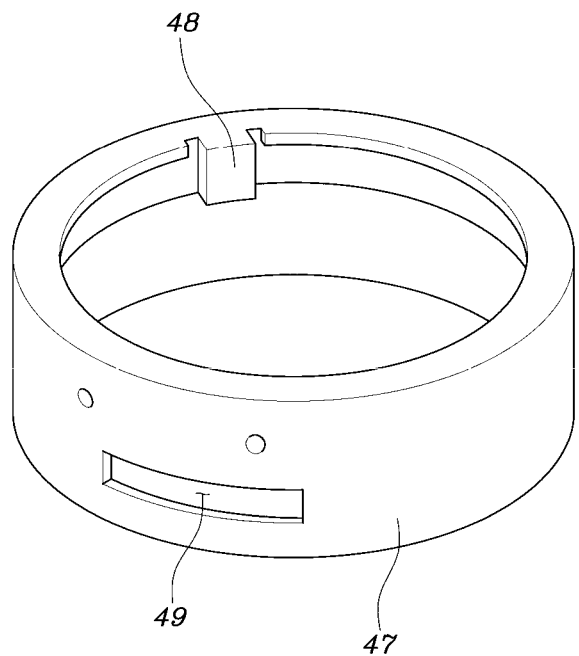
FIG. 11 is a view illustrating a lock device in detail.

FIG. 11 is a view illustrating the lock device 47 in detail. The lock device 47 has a sliding preventing protrusion 48 formed at an inner side thereof, and has a locking hole 49 formed at one side thereof. The sliding preventing protrusions 48 move in the vertical direction along the sliding grooves 24 and 32 formed, respectively, in the upper end handle part 21 and the intermediate handle part 25, and are then inserted into or withdrawn from the sliding preventing grooves 52. Therefore, the sliding preventing protrusions 48 are inserted into the sliding preventing grooves 52 to prevent the upper end handle part 21 and the intermediate handle part 25 or the intermediate handle part 25 and the lower end handle part 26 from being slid in the length direction. The sliding preventing protrusions 48 are withdrawn from the sliding preventing grooves 52 to allow the upper end handle part 21 and the intermediate handle part 25 or the intermediate handle part 25 and the lower end handle part 26 to be slidable in the length direction. The sliding preventing grooves 52 are formed to have heights that gradually narrow as they become more distant from the sliding grooves 24 and 32, such that the upper end handle part 21, the intermediate handle part 25, the intermediate handle part 25, and the lower end handle part 26 are sufficiently closely adhered to each other.

Figure 12:
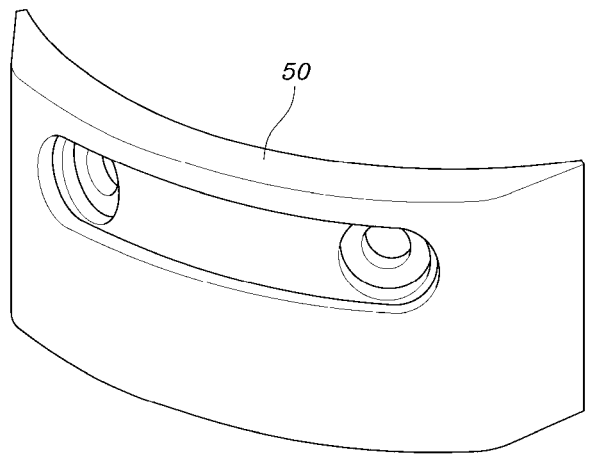
FIGS. 12 and 13 are views illustrating a fixing device in detail.
Figure 13:
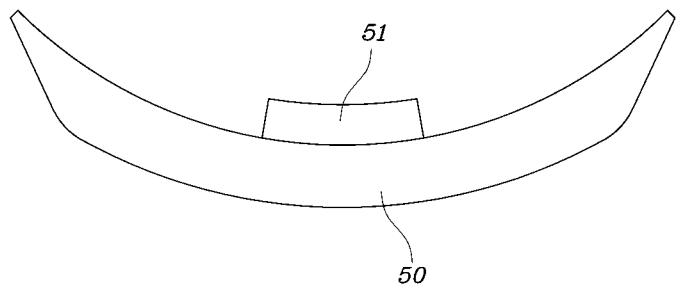

In addition, FIGS. 12 and 13 are views illustrating the fixing device 50 in detail. The fixing device 50 has a protrusion 51 formed at one side thereof, as illustrated in FIG. 13. The protrusions 51 of the fixing devices 50 are installed to penetrate through the locking holes 49 of the lock device 47 and to then be maintained in a state in which they are inserted into the fixing slots 55 and 56. Therefore, at the time of rotation of the lock devices 47, the protrusions 51 are maintained in the state in which they are inserted into the fixing slots 55 and 56, such that movement of the handle part 54 in an axial direction is prevented in a state in which the handle part 54 is received and the lock devices 47 and the intermediate handle part 25 or the lower end handle part 26 may be relatively rotatable in a state in which the handle part 54 is withdrawn.

Figure 14:
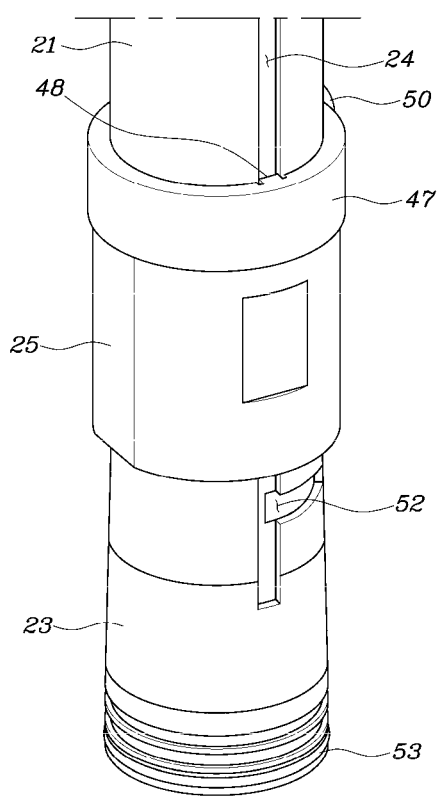
FIGS. 14 and 15 are views illustrating forms before and after the handle part is locked.
Figure 15:
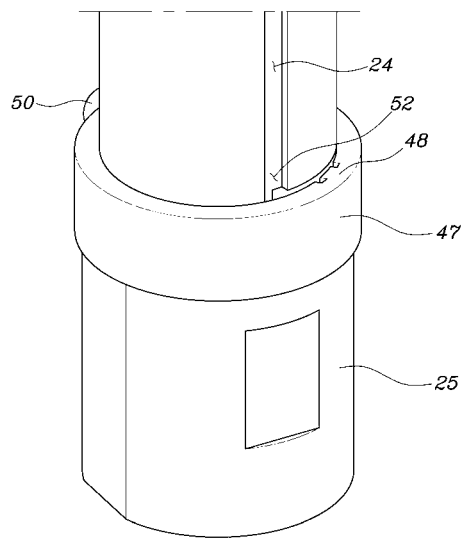
Figure 16:
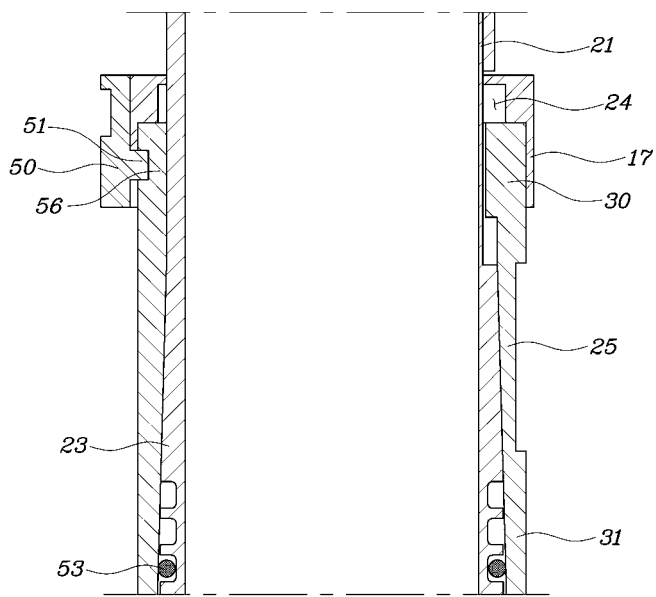
FIG. 16 is a cross-sectional view of FIGS. 14 and 15.
Figure 17:
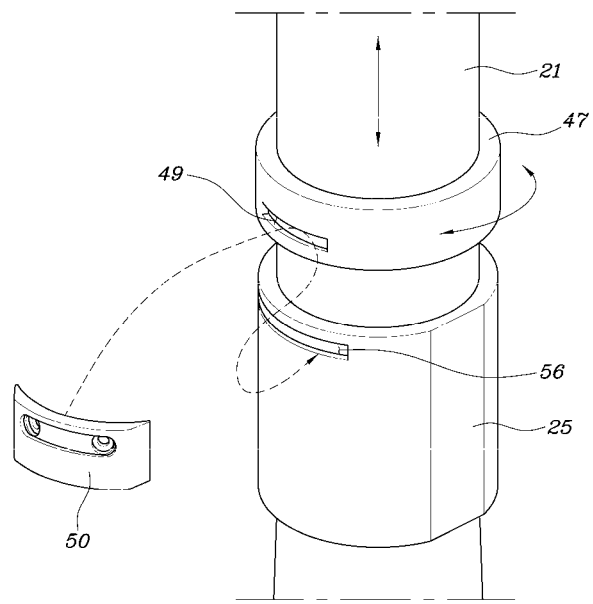
FIG. 17 is a view illustrating a sequence in which the lock device and the fixing device are coupled to each other.

FIGS. 14 and 15 are views illustrating forms before and after the handle part 54 is locked. FIG. 16 is a cross-sectional view of FIGS. 14 and 15. FIG. 17 is a view illustrating a sequence in which the lock device 47 and the fixing device 50 are coupled to each other. A form in which the upper end handle part 21 and the intermediate handle part 25 are coupled to each other is illustrated and described by way of example in FIGS. 14-17. As illustrated in FIGS. 14-17, the lock device 47 relatively rotates to the intermediate handle part 25 in a state in which the protrusion 51 of the fixing device 50 is inserted into the fixing slot 56, such that the sliding preventing protrusion 48 is inserted and fixed into the sliding preventing groove 52. Although not illustrated in FIGS. 14-17, also in the case of the intermediate handle part 25 and the lower end handle part 26, the lock device 47 relatively rotates to the lower end handle part 26 in a state in which the protrusion 51 of the fixing device 50 is inserted into the fixing slot 55, such that the sliding preventing protrusion 48 is inserted and fixed into the sliding preventing groove 52. Therefore, the upper end handle part 21 and the intermediate handle part 25 or the intermediate handle part 25 and the lower end handle part 26 are firmly coupled to each other and are maintained in a state in which the upper end handle part 21 is inserted into or withdrawn from the intermediate handle part 25 or the intermediate handle part 25 is inserted into or withdrawn from the lower end handle part 26.

More specifically, due to the devices as described above, the handle part 54 of the folding personal mobility vehicle 1 according to an embodiment of the present disclosure is formed so that the upper end handle part 21, the intermediate handle part 25, and the lower end handle part 26 are slid in the vertical direction. Therefore, when the upper end handle part 21 is completely withdrawn from the intermediate handle part 25 and the intermediate handle part 25 is completely withdrawn from the lower end handle part 26, the lower end of the upper end handle part 21 and the upper end of the intermediate handle part 25, and the lower end of the intermediate handle part 25 and the upper end of the lower end handle part 26 are fixed and supported by the lock devices 47, the sliding preventing grooves 52, and the fixing devices 50. When the upper end handle part 21 is completely inserted into the intermediate handle part 25 and the intermediate handle part 25 is completely inserted into the lower end handle part 26, the upper end of the upper end handle part 21, the upper end of the intermediate handle part 25, and the upper end of the lower end handle part 26 are fixed and supported by the lock devices 47, the sliding preventing grooves 52, and the fixing devices 50. In the other states such as a state during insertion, a state during withdrawal, and the like, the upper end handle part 21, the intermediate handle part 25, and the lower end handle part 26 are configured to be freely slidable in the vertical direction. Therefore, the user may easily manipulate the upper end handle part 21, the intermediate handle part 25, and the lower end handle part 26, thereby increasing convenience.

The footboard part 4 is configured to include the front footboard part 6 having the wheel carrier 8 coupled to the front thereof and having the front wheel 2 coupled to the wheel carrier 8. The rear footboard part 7 is rotatably coupled to the front footboard part 6 through the hinge shaft 35 of the hinge structure 5, and is folded to be closely adhered onto the front footboard part 6. The rear wheel 3 is coupled to the rear footboard part 7.

Figure 18:
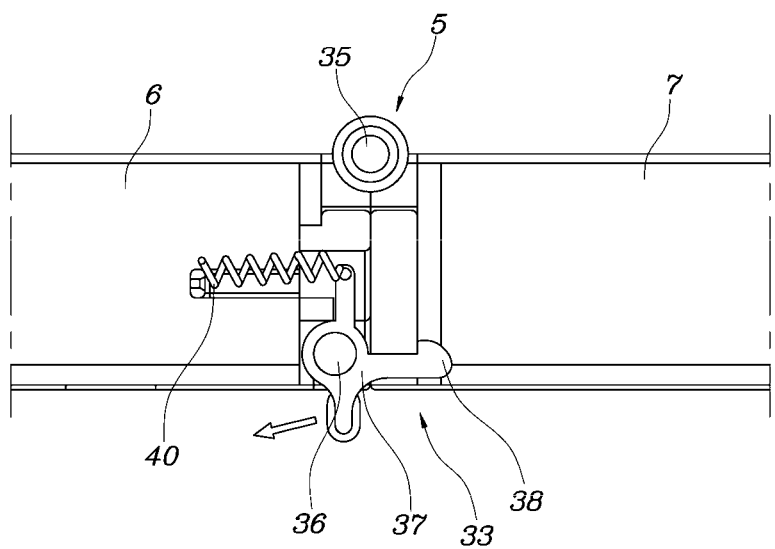
FIGS. 18 and 19 are views illustrating forlLLs before and after a footboard part is folded.
Figure 19:
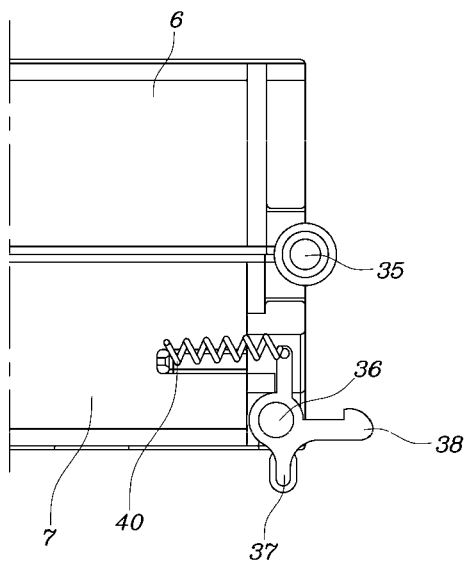

FIGS. 18 and 19 are views illustrating forms before and after the footboard part 4 is folded. The footboard part 4 is configured to include the front footboard part 6 in which the front wheel 2 is installed and the rear footboard part 7 in which the rear wheel 3 is installed. The rear footboard part 7 is rotatably coupled to the front footboard part 6 through the hinge shaft 35 of the hinge structure 5. The footboard part 4 further includes a footboard locking means 33 to lock the front footboard part 6 and the rear footboard part 7 in a state in which they are unfolded.

An edge portion of an upper end of the rear of the front footboard part 6 and an edge portion of an upper end of the front of the rear footboard part 7 overlap with each other and are rotatably coupled to each other through the hinge shaft 35 of the hinge structure 5. The footboard locking means 33 is configured to include a locking lever 37 installed at an edge portion of a lower end of the rear of the front footboard part 6 to be rotatable through a lever shaft 36. The footboard locking means 33 is also configured to include a locking protrusion groove 39 formed at an edge portion of a lower end of the front of the rear footboard part 7 so that a locking protrusion 38 formed at one end of the locking lever 37 is inserted thereinto and hooked thereto. A lever spring 40, which is wound around the lever shaft 36, has one end fixed to the front footboard part 6 and the other end fixed to the locking lever 37. The lever spring 40 provides elastic force to the locking lever 37 so that the locking lever 37 may rotate in a direction in which the locking protrusion 38 is inserted into the locking protrusion groove 39.

Therefore, when the user H pulls the locking lever 37 with force greater than the elastic force of the lever spring 40 to rotate the locking lever 37 around the lever shaft 36, the front footboard part 6 and the rear footboard part 7 are separated from each other so as to be rotatable around the hinge shaft 35. After the front footboard part 6 and the rear footboard part 7 are separated from each other, the rear footboard part 7 rotates around the hinge shaft 35 to be folded so that an upper surface of the front footboard part 6 and an upper surface of the rear footboard part are closely adhered to each other. The rear footboard part 7 is then maintained in a state in which it is folded.

FIGS. 20-24 are views illustrating processes of folding the folding personal mobility vehicle 1 according to an embodiment of the present disclosure by the hinge locking means 9.

Figure 20:
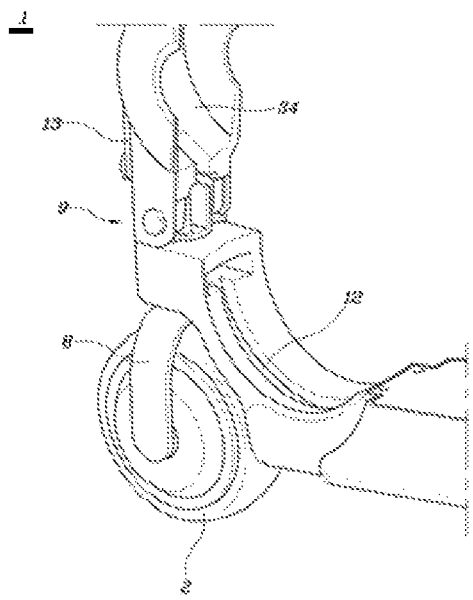
FIGS. 20-24 are views illustrating processes of folding the folding personal mobility vehicle according to an embodiment of the present disclosure and by a hinge locking means.

In a state illustrated in FIG. 20, in the folding personal mobility vehicle 1 according to an embodiment of the present disclosure, the handle part 54 is folded and overlaps with the footboard par 4. In order to implement such an operation, the wheel carrier 8 is coupled to the front of the footboard part 4, the front wheel 2 is coupled to the wheel carrier 8, and the lower end handle part 26 is coupled to the wheel carrier 8 through the hinge locking means 9.

More specifically, an upper end of the wheel carrier 8 and a lower end of the lower end handle part 26 are hinge-coupled to each other, such that an operation of folding the handle part 54 is possible. The lower end handle part 26 is provided with a sliding part 10, and the wheel carrier 8 is provided with a shaft 11 so that the lower end handle part 26 is rotatable.

The sliding part 10 is configured to include a sliding button 13 installed on the lower end handle part 26 and provided to be slidable. A support member 14 is connected to the sliding button 13 and allows or blocks rotation of the shaft 11, and a sliding slot 15 is formed so that the sliding button 13 is movable therein. As illustrated in FIG. 20, when the support member 14 is in contact with the upper end of the wheel carrier 8, the rotation of the shaft 11 is blocked.

More specifically, the sliding button 13 moves in the sliding slot 15 for the purpose of the operation of folding the handle part 54 and is again slid after completion of the operation of folding the handle part 54 to be positioned at the position blocking the upper end of the wheel carrier 8 to stop the rotation of the handle part 54.

Figure 21:
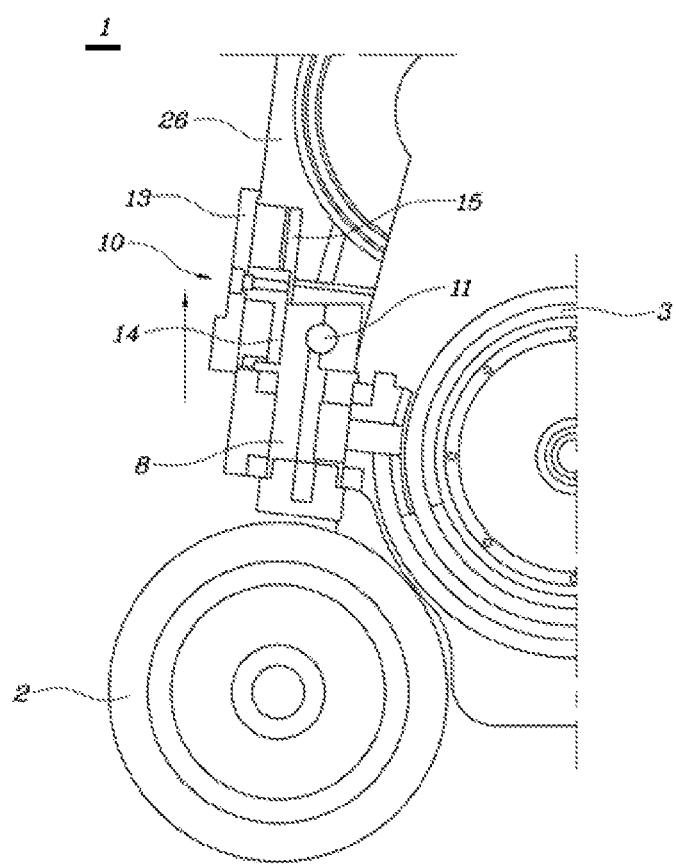
Figure 22:
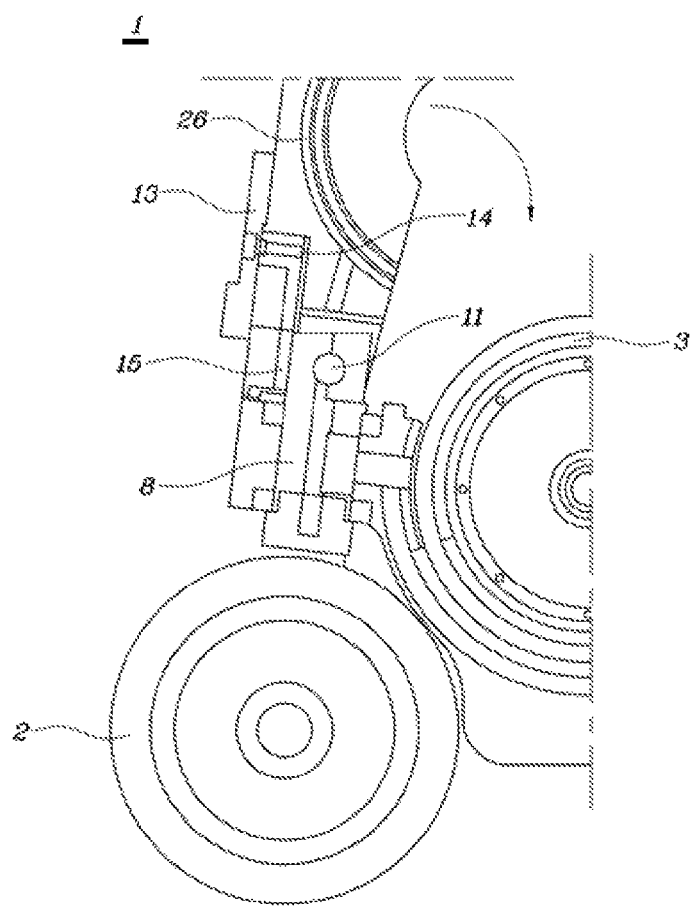

In this state, when the sliding button 13 is slid upwardly and moves in the sliding slot 15 as illustrated in FIG. 21, a contact between the support member 14 and the upper end of the wheel carrier 8 is released. Therefore, the shaft 11 becomes a state in which it is rotatable, such that an operation of folding the handle part 54 toward the footboard part 4 is possible. In this state, the handle part 54 rotates and is folded toward the footboard part 4 to be closely adhered to the footboard part 4, as illustrated in FIG. 22.

Figure 23:
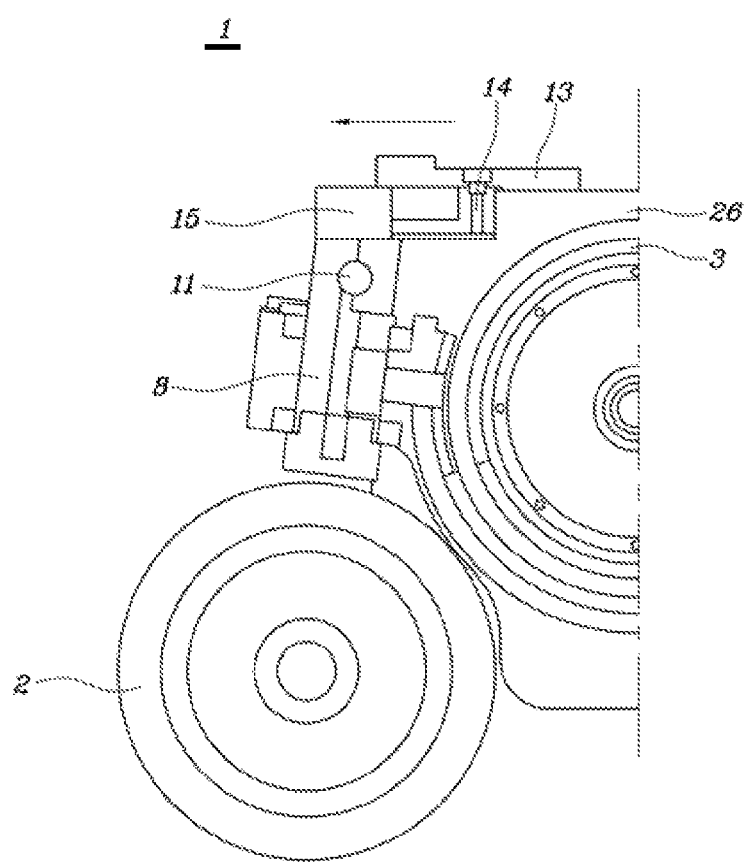

Then, as illustrated in FIG. 23, the sliding button 13 moves toward the wheel carrier 8 in the sliding slot 15. In this case, the sliding button 13 is positioned at a position blocking the upper end of the wheel carrier 8 to stop the rotation of the handle part 54. More specifically, the sliding button 13 moves in the sliding slot 15 for the purpose of the operation of folding the handle part 54 and is again slid after completion of the operation of folding the handle part 54 to be positioned at the position blocking the upper end of the wheel carrier 8 to stop the rotation of the handle part 54. In other words, the lower end handle part 26 is maintained in a state in which it is folded by the hinge locking means 9.

Figure 24:
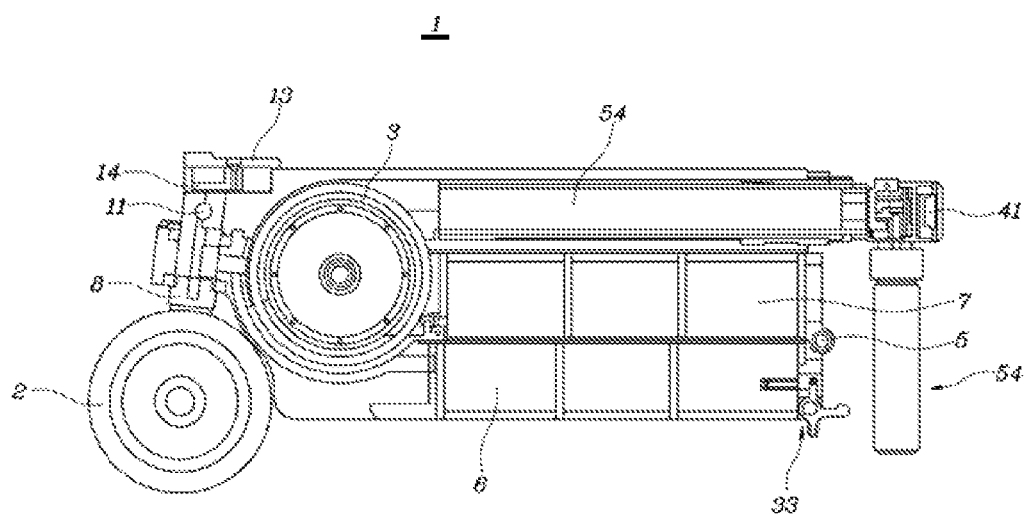

Therefore, as illustrated in FIG. 24, the rear footboard part 7 is folded to be closely adhered onto the front footboard 6, the lower end handle part 26 is folded to be closely adhered onto the rear footboard part 7, and the handles 16 and 17 are positioned at one side of the front footboard part 6 and the rear footboard part 7 in a state in which they are folded. In addition, the wheel groove 12 is formed in the front footboard part 6, and the wheel groove 34 is formed in the housing 57 of the lower end handle part 26, such that when the rear footboard part 7 is folded to be closely adhered onto the front footboard part 6, the rear wheel 3 is inserted into the wheel grooves 12 and 34. Therefore, the front footboard part 6 and the rear footboard part 7 are more closely adhered to each other.

Figure 25:
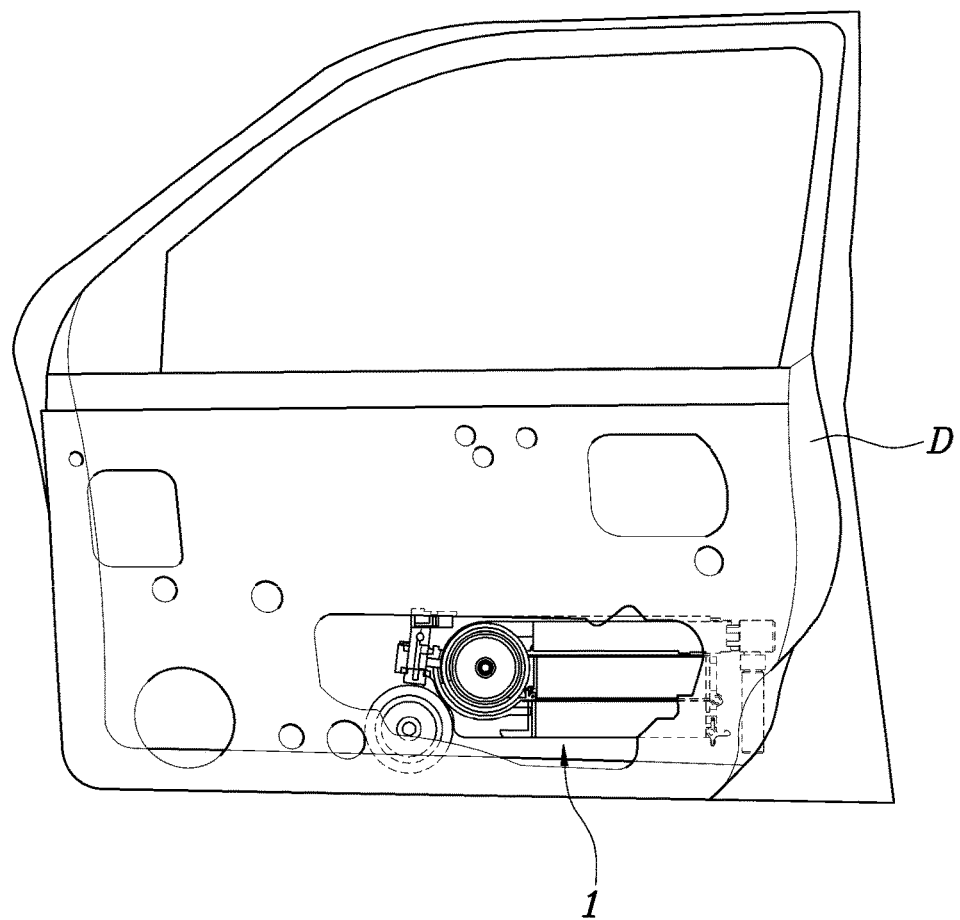
FIGS. 25-27 are views illustrating receiving and moving methods of the folding personal mobility vehicle according to an embodiment of the present disclosure.
Figure 26:
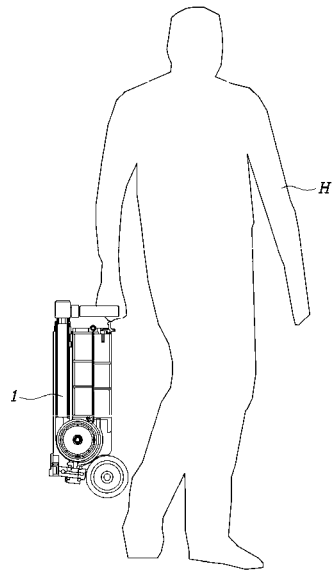
Figure 27:
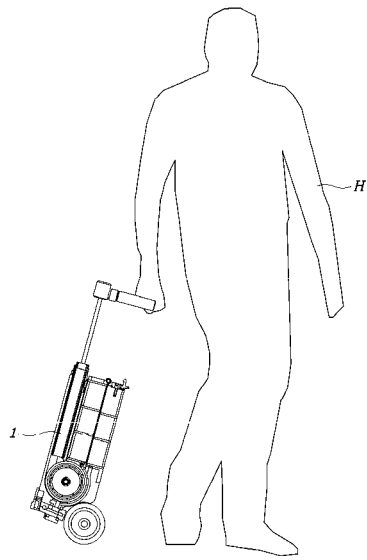

FIGS. 25-27 are views illustrating receiving and moving methods of the folding personal mobility vehicle 1 according to an embodiment of the present disclosure.

The folding personal mobility vehicle 1 according to an embodiment of the present disclosure configured in the structure as described above may be implemented at a size compact enough to be received in the door of the vehicle when it is completely folded. In addition, the user may move while holding the folding personal mobility vehicle 1 in a state in which the folding personal mobility vehicle is completely folded or may move while pulling the folding personal mobility vehicle using the front wheel in a state in which a portion of the handle part is withdrawn, such that movement is convenient.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A folding personal mobility vehicle comprising:
a footboard part including wheels; and
a handle part including handles,
wherein the footboard part includes a front footboard part and a rear footboard part connected to each other through a hinge structure to be folded,
wherein the handle part has a length changed through sliding and is foldable toward the footboard part,
wherein the rear footboard part is folded on an upper surface of the front footboard part through the hinge structure, the handle part is folded on the rear footboard part in a state in which the length of the handle part is shortened through the sliding, and the rear footboard part is positioned between the handle part and the front footboard part in a folded state in which the rear footboard part and the handle part are folded,
wherein in a state in which the footboard part is folded, the handle part is folded to surround a lower surface of the rear footboard part and a side surface of the folded footboard part and to allow a side surface of the handle part and the lower surface of the rear footboard part to be adjacent to each other so that the rear footboard part is positioned between the handle part and the front footboard part, and
wherein the handle part and the rear footboard part and the rear footboard part and the front footboard part are adjacent to each other in parallel with each other.

2. A folding personal mobility vehicle comprising:
a footboard part including a front footboard part and a rear footboard part; and
a handle part including handles,
wherein the front footboard part has a wheel carrier disposed in the front thereof and has a front wheel disposed in the wheel carrier, the rear footboard part has a rear wheel disposed in the rear thereof, and the front footboard part and the rear footboard part are rotatably coupled to each other through a hinge shaft,
wherein the handle part has a length that is changed through sliding, and is coupled to the wheel carrier through a hinge locking mechanism,
wherein the rear footboard part rotates around the hinge shaft to be folded on an upper surface of the front footboard part, the handle part rotates through the hinge locking mechanism to be folded on the rear footboard part in a state in which a length of the handle part is shortened by the sliding, and the rear footboard part is positioned between the handle part and the front footboard part in a folded state in which the rear footboard part and the handle part are folded,
wherein in a state in which the footboard part is folded, the handle part is folded to surround a lower surface of the rear footboard part and a side surface of the folded footboard part and to allow a side surface of the handle part and the lower surface of the rear footboard part to be adjacent to each other so that the rear footboard part is positioned between the handle part and the front footboard part, and
wherein the handle part and the rear footboard part and the rear footboard part and the front footboard part are adjacent to each other in parallel with each other.

3. The folding personal mobility vehicle of claim 2, wherein the handle part includes a lower end handle part coupled to the wheel carrier through a hinge locking means, an upper end handle part coupled to the lower end handle part through a sliding means, and handles provided to be foldable with respect to the upper end handle part.

4. The folding personal mobility vehicle of claim 3, wherein a rotation center part is installed at an upper end of the upper end handle part, and a left handle and a right handle are rotatably installed at both sides of the rotation center part, respectively.

5. The folding personal mobility vehicle of claim 4, wherein the rotation center part is provided with a left gear sharing a shaft of the left handle and a right gear sharing a shaft of the right handle, and
wherein the left gear and the right gear are installed to be engaged with each other, such that even though only one handle of the left handle and the right handle rotates, the other of the left handle and the right handle rotates simultaneously with rotation of the one handle.

6. The folding personal mobility vehicle of claim 4, wherein the rotation center part is provided with fixing pins stopping rotation of the handles and mounted on an unlock bar provided therein and is provided with an unlock button connected to the unlock bar and protruding outwardly of the rotation center part, and the handles include fixing grooves formed so that the fixing pins are insertable thereinto or withdrawable therefrom, wherein, when the unlock button is pressed, the unlock bar is pressed to separate the fixing pins from the fixing grooves, thereby enabling the rotation of the handles.

7. The folding personal mobility vehicle of claim 6, wherein an elastic member is installed at the unlock bar in a form in which the elastic member always presses the unlock button outwardly,
wherein, when an external force acting on the unlock button is released, the fixing pins are elastically inserted into the fixing grooves by the elastic member.

8. The folding personal mobility vehicle of claim 3, wherein an intermediate handle part is provided between the upper end handle part and the lower end handle part, the upper end handle part is slid downwardly by the sliding means to be inserted into the intermediate handle part, and the intermediate handle part is slid downwardly by the sliding means to be inserted into the lower end handle part.

9. The folding personal mobility vehicle of claim 8, wherein the upper end handle part has a taper part having an outer diameter that becomes larger in a downward direction and the intermediate handle part is mounted on and coupled to the taper part, and wherein the upper end handle part has a sliding groove formed therein in a length direction and the intermediate handle part has a sliding protrusion formed at an upper end of an inner side thereof, such that the sliding protrusion is slid in the sliding groove to allow the upper end handle part to be insertable into or withdrawable from the intermediate handle part.

10. The folding personal mobility vehicle of claim 8, wherein the intermediate handle part has a taper part having an outer diameter that becomes larger in a downward direction and the lower end handle part is mounted on and coupled to the taper part, and wherein the intermediate handle part has a sliding groove formed therein in a length direction and the lower end handle part has a sliding protrusion formed at an upper end of an inner side thereof, such that the sliding protrusion is slid in the sliding groove to allow the intermediate handle part to be insertable into or withdrawable from the lower end handle part.

11. The folding personal mobility vehicle of claim 8, wherein sliding grooves are formed in the upper end handle part and the intermediate handle part in a length direction, wherein sliding preventing grooves having a height that gradually becomes narrower as the sliding preventing grooves become distant from the sliding grooves are formed at upper and lower sides of the sliding grooves, wherein lock devices having sliding preventing protrusions are installed at inner sides of upper ends of the intermediate handle part and the lower end handle part, respectively, and wherein the sliding preventing protrusions are inserted into the sliding preventing grooves to prevent the upper end handle part and the intermediate handle part or the intermediate handle part and the lower end handle part from being slid in the length direction.

12. The folding personal mobility vehicle of claim 11, wherein, when the sliding preventing protrusions of the lock devices are in a state in which the sliding preventing protrusions are withdrawn from the sliding preventing grooves, the sliding preventing protrusions are positioned in the sliding grooves to allow the upper end handle part or the lower end handle part to be slidable.

13. The folding personal mobility vehicle of claim 11, wherein fixing slots are formed at the upper ends of the intermediate handle part and the lower end handle part, respectively, locking holes are formed in the lock devices, and fixing devices having protrusions are installed in the locking holes, and wherein the protrusions are maintained in the state in which the protrusions are inserted into the fixing slots, thereby allowing the lock device and the intermediate handle part or the lock device and the lower end handle part to be relatively rotatable, while preventing the lock device and the intermediate handle part or the lock device and the lower end handle part from moving in an axial direction.

14. The folding personal mobility vehicle of claim 8, wherein sliding preventing members are provided on outer peripheral surfaces of a lower end of the upper end handle part and a lower end of the intermediate handle part.

15. The folding personal mobility vehicle of claim 3, wherein the rear footboard part is folded on the front footboard part, the lower end handle part is folded on the rear footboard part, and the handles are positioned at one side of the front footboard part and the rear footboard part.

16. The folding personal mobility vehicle of claim 3, wherein the lower end handle part is maintained in a state in which the lower end handle part is folded by the hinge locking means.

17. The folding personal mobility vehicle of claim 3, wherein an upper end of the wheel carrier and a lower end of the lower end handle part are hinge-coupled to each other to allow an operation of folding the handle part, the lower end handle part is provided with a sliding part, and the wheel carrier is provided with a shaft so that the lower end handle part is rotatable.

18. The folding personal mobility vehicle of claim 17, wherein the sliding part includes a sliding button installed on the lower end handle part and provided to be slidable, a support member connected to the sliding button and allowing or blocking rotation of the shaft, and a sliding slot formed so that the sliding button is movable therein, wherein, when the support member is in contact with the upper end of the wheel carrier, the rotation of the shaft is blocked, and wherein, when the sliding button moves in the sliding slot to release a contact between the support member and the upper end of the wheel carrier, the shaft becomes rotatable, such that an operation of folding the handle part toward the footboard part is possible.

19. The folding personal mobility vehicle of claim 18, wherein the sliding button moves in the sliding slot for the operation of folding the handle part, and again moves after completion of the operation of folding the handle part to stop the rotation of the handle part by blocking the upper end of the wheel carrier.

20. The folding personal mobility vehicle of claim 2, wherein a wheel groove is formed in the front of an upper surface of the front footboard part, and wherein the rear wheel is inserted into the wheel groove when the rear footboard part is folded on the front footboard part.

21. The folding personal mobility vehicle of claim 2, wherein the footboard part further includes a footboard locking means locking a state in which the front footboard part and the rear footboard part are unfolded.

22. The folding personal mobility vehicle of claim 21, wherein an edge portion of an upper end of the rear of the front footboard part and an edge portion of an upper end of the front of the rear footboard part overlap with each other and are rotatably coupled to each other through the hinge shaft.

23. The folding personal mobility vehicle of claim 22, wherein the footboard locking means includes:

a locking lever installed at an edge portion of a lower end of the rear of the front footboard part to be rotatable through a lever shaft;

a locking protrusion groove formed at an edge portion of a lower end of the front of the rear footboard part so that a locking protrusion formed at one end of the locking lever is inserted thereinto and hooked thereto; and a lever spring wound around the lever shaft, the lever spring having one end fixed to the front footboard part and the other end fixed to the locking lever, wherein the lever spring provides elastic force to the locking lever so that the locking lever rotates in a direction in which the locking protrusion is inserted into the locking protrusion groove.

24. The folding personal mobility vehicle of claim 2, wherein the footboard part further includes a footboard locking means, and the footboard locking means includes:

a locking lever installed at an edge portion of a lower end of the rear of the front footboard part to be rotatable through a lever shaft;

a locking protrusion groove formed at an edge portion of a lower end of the front of the rear footboard part so that a locking protrusion formed at one end of the locking lever is inserted thereinto and hooked thereto; and a lever spring providing elastic force to the locking lever so that the locking lever rotates in a direction in which the locking protrusion is inserted into the locking protrusion groove.

25. The folding personal mobility vehicle of claim 2, wherein wheel grooves are formed in the front of an upper surface of the front footboard part and a housing of the handle part, respectively, and wherein the rear wheel is inserted into the wheel grooves when the rear footboard part is folded on the front footboard part.

\* \* \* \* \*